United States Patent [19]
Shiraishi et al.

[11] Patent Number: 5,472,061
[45] Date of Patent: Dec. 5, 1995

[54] DRIVEN WHEEL TORQUE CONTROL SYSTEM

[75] Inventors: Shuji Shiraishi; Osamu Yamamoto; Toru Ikeda; Naoki Omomo, all of Wako, Japan

[73] Assignee: Honda Giken Kogyo Kabushiki Kaisha, Tokyo, Japan

[21] Appl. No.: 214,327

[22] Filed: Mar. 17, 1994

[30] Foreign Application Priority Data

Apr. 30, 1993 [JP] Japan .................................. 4-104075

[51] Int. Cl.$^6$ .................................................. B60K 28/16
[52] U.S. Cl. .................................... 180/197; 364/426.03
[58] Field of Search ........................ 180/197; 364/426.01, 364/426.02, 426.03

[56] References Cited

U.S. PATENT DOCUMENTS

| | | | |
|---|---|---|---|
| 4,962,570 | 10/1990 | Hosaka et al. | 123/399 |
| 5,033,002 | 7/1991 | Sol | 180/197 X |
| 5,043,896 | 8/1991 | Sol | 180/197 X |
| 5,119,299 | 6/1992 | Tamura et al. | 364/426.02 |
| 5,132,906 | 7/1992 | Sol et al. | 180/197 X |
| 5,135,290 | 8/1992 | Cao | 180/197 X |
| 5,172,319 | 12/1992 | Shiraishi et al. | 364/426.03 |
| 5,198,982 | 3/1993 | Kobayashi | 180/197 X |
| 5,245,542 | 9/1993 | Itoh et al. | 180/197 X |
| 5,255,192 | 10/1993 | Ito et al. | 180/197 X |

Primary Examiner—Margaret A. Focarino
Assistant Examiner—Kevin Hurley
Attorney, Agent, or Firm—Armstrong, Westerman, Hattori, McLeland & Naughton

[57] ABSTRACT

A driven wheel torque control system includes a slip-reduction output torque control device for adjusting the output torque from a prime mover of a vehicle in accordance with the slipping state of a driven wheel driven by the prime mover in order to reduce an excessive slipping of the driven wheel, an operation quantity detecting device for detecting the operation quantity of an operating element for adjusting the output torque from the prime mover, a grip force detecting device for detecting a grip force of a road surface, an output torque gain changing device for changing the output torque control gain from the prime mover with respect to the output from the operation quantity detecting device on the basis of the output from the grip force detecting device, and a gain variable output torque control device for adjusting the output torque from the prime mover on the basis of the output torque control gain changed by the output control gain changing device. Thus, it is possible to positively control the slipping state of the driven wheel on the basis of a driver's will.

12 Claims, 8 Drawing Sheets

DRIVEN WHEEL TORQUE CONTROL SYSTEM

BACKGROUND OF THE INVENTION

1. Field of the Invention

The present invention relates to a driven wheel torque control system including a slip-reduction output torque control means for adjusting an output torque from a prime mover, of a vehicle, in accordance with the slipping state of a driven wheel driven by the prime mover in order to reduce an excessive slipping of the driven wheel.

2. Description of the Prior Art

There is conventionally known a so-called traction control system which assists the driving operation, on a snow-laden road or an iced road having a small road surface frictional coefficient, by controlling the output from an engine, which is a prime mover, to increase or decrease such output in accordance with the slipping state of a driven wheel generated upon acceleration of the vehicle (for example, see Japanese Patent Application Laid-open No. 8839/92).

However, in the vehicle equipped with such a traction control system, when a driven wheel is brought into a slipping state, the output from an engine is controlled to decrease such output regardless of a driver's will. Therefore, it is difficult for the driver to consciously cause slipping of the driven wheel to provide sporty driving. In addition, when driving on a road having a very small road surface frictional coefficient, only several % to several tens % of the output from the engine is transmitted. For this reason, the traction control device is operated only by slightly depressing an accelerator pedal and, therefore, the output from the engine is controlled to be decreased. Therefore, on a road surface having a small frictional coefficient, a range of the accelerator pedal through which a driver can consciously control the output from the engine is extremely small. Thus, it is difficult to control the accelerator pedal in such small range to provide a delicate slipping state.

SUMMARY OF THE INVENTION

The present invention has been accomplished in view of the above circumstances, and an object of the invention is to make it possible to positively control, by the driver's will, the slipping state of the driven wheel of a vehicle equipped with a traction control device.

To achieve the above object, according to the present invention, there is provided a driven wheel torque control system including a slip-reduction output torque control means for adjusting an output torque from a prime mover of a vehicle in accordance with the slipping state of a driven wheel driven by the prime mover in order to reduce an excessive slipping of the driven wheels, an operation quantity detecting means for detecting the operation quantity of an operating element for adjusting the output torque from the prime mover, a grip force detecting means for detecting a grip force of a road surface, an output torque gain changing means for changing an output torque control gain from the prime mover with respect to an output from the operation quantity detecting means on the basis of an output from the grip force detecting means, and a gain variable output torque control means for controlling the output torque from the primer mover on the basis of the output torque control gain changed by the output control gain changing means.

With the above arrangement, the output torque control gain from the prime mover, according to the operation quantity of the operating element which adjusts the output torque from the prime mover, is changed on the basis of the grip force of the road surface. Therefore, in a road surface condition of a small frictional coefficient, even if the operating element is operated to a large extent, the output torque from the prime mover is not varied largely. This enables a delicate control of the slipping state. Moreover, even when the slipping of the driven wheel is reduced by the slip-reduction output torque control means, the operation quantity of the operating element is reflected to the output torque from the prime mover in accordance with the slipping state. Therefore, it is possible to control the slipping state by a driver's will.

If the grip force detecting means estimates a grip force of a road surface on the basis of at least one of a longitudinal acceleration and a lateral acceleration of the vehicle, the grip force of the road surface can be detected simply and correctly.

Further, in changing the output torque control gain from the prime mover by the output torque control gain changing means, the output torque control gain may be increased, or decreased, on the basis of the estimated grip force of the road surface, when the driven wheel is in a predetermined slipping state, and only the increasing of the output torque control gain may be permitted, when the driven wheel is in a state other than the predetermined slipping state. With this arrangement, it is possible to obtain an appropriate output torque from the prime mover corresponding to a road surface condition. Moreover, in the state other than the predetermined slipping state, the output torque control gain from the prime mover is changed only in its increasing direction. Therefore, the quantity of operating element, operated by a driver, is not increased excessively.

The above and other objects, features and advantages of the invention will become apparent from the following description of a preferred embodiment, taken in conjunction with the accompanying drawings.

DESCRIPTION OF THE PREFERRED EMBODIMENTS

A preferred embodiment of the present invention will now be described in connection with the accompanying drawings.

Figure 1:
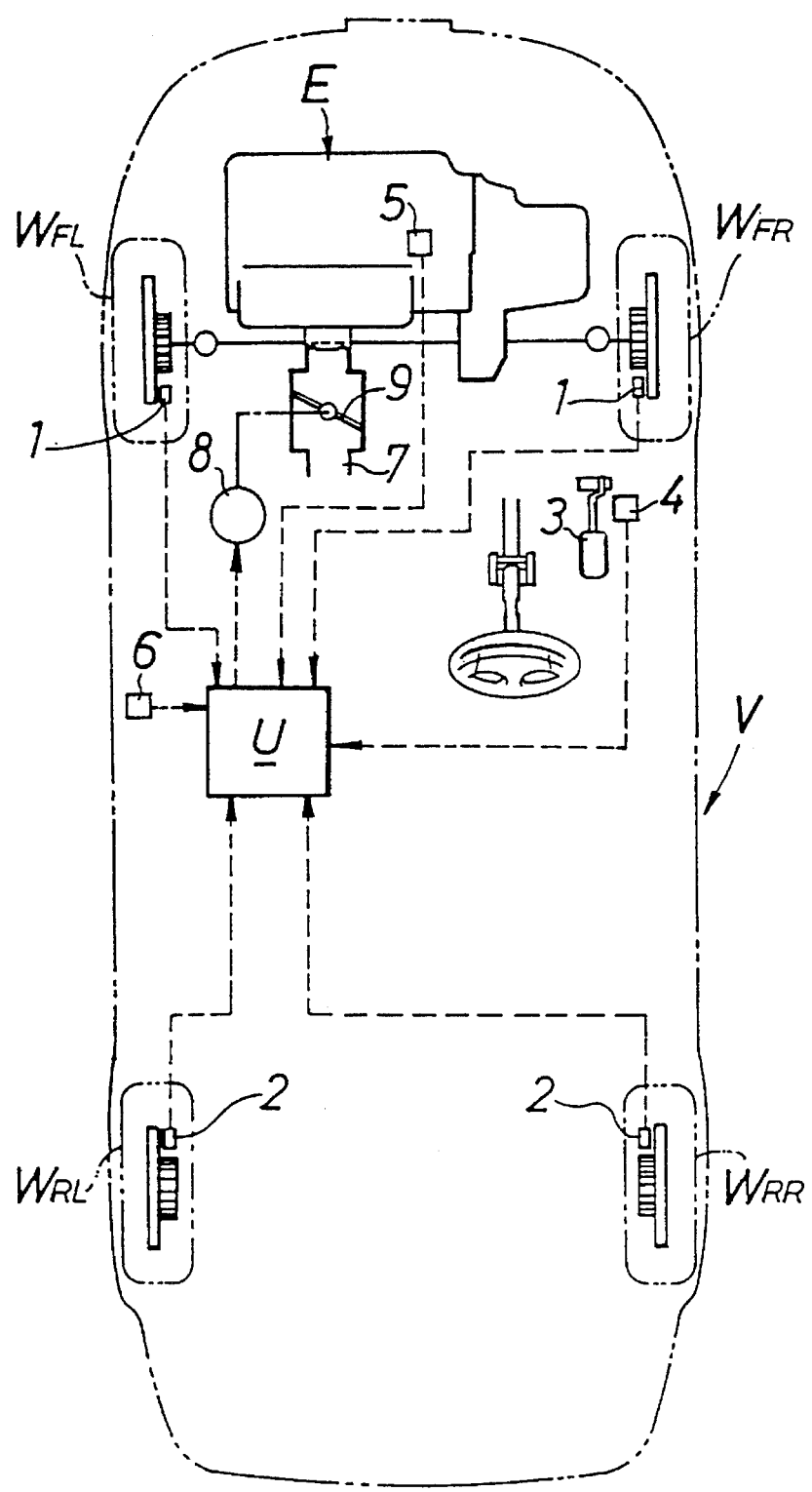
FIG. 1 is a schematic diagram of the construction of a vehicle equipped with a driven wheel torque control system.

Referring to FIG. 1, a front engine and front drive vehicle V includes a pair of left and right driven wheels $W_{FL}$ and $W_{FR}$ driven by an engine E, and a pair of left and right follower wheel $W_{RL}$ and $W_{RR}$. A pair of driven wheel speed detecting means 1, 1 are mounted on the driven wheels $W_{FL}$ and $W_{FR}$ for detecting driven wheel speeds, respectively. A pair of follower wheel speed detecting means 2, 2 are mounted on the follower wheels $W_{RL}$ and $W_{RR}$ for detecting follower wheel speeds, respectively.

An accelerator pedal 3, as an operating element for adjusting the output from an engine E, is provided with an accelerator opening degree detecting means 4 for detecting the opening degree of an accelerator. The engine E is provided with an engine revolution-number detecting means 5 for detecting the number of revolutions of the engine. A lateral acceleration detecting means 6 is mounted in place on a vehicle body for detecting a lateral acceleration of the vehicle body. A throttle valve 9 is mounted on an intake passage 7 of the engine E and is connected to a pulse motor 8 for opening and closing throttle valve 9. The driven wheel speed detecting means 1, 1, the follower wheel speed detecting means 2, 2, the accelerator opening degree detecting means 4, the engine revolution-number detecting means 5, the lateral acceleration detecting means 6 and the pulse motor 8 are connected to an electronic control unit U.

Figure 2:
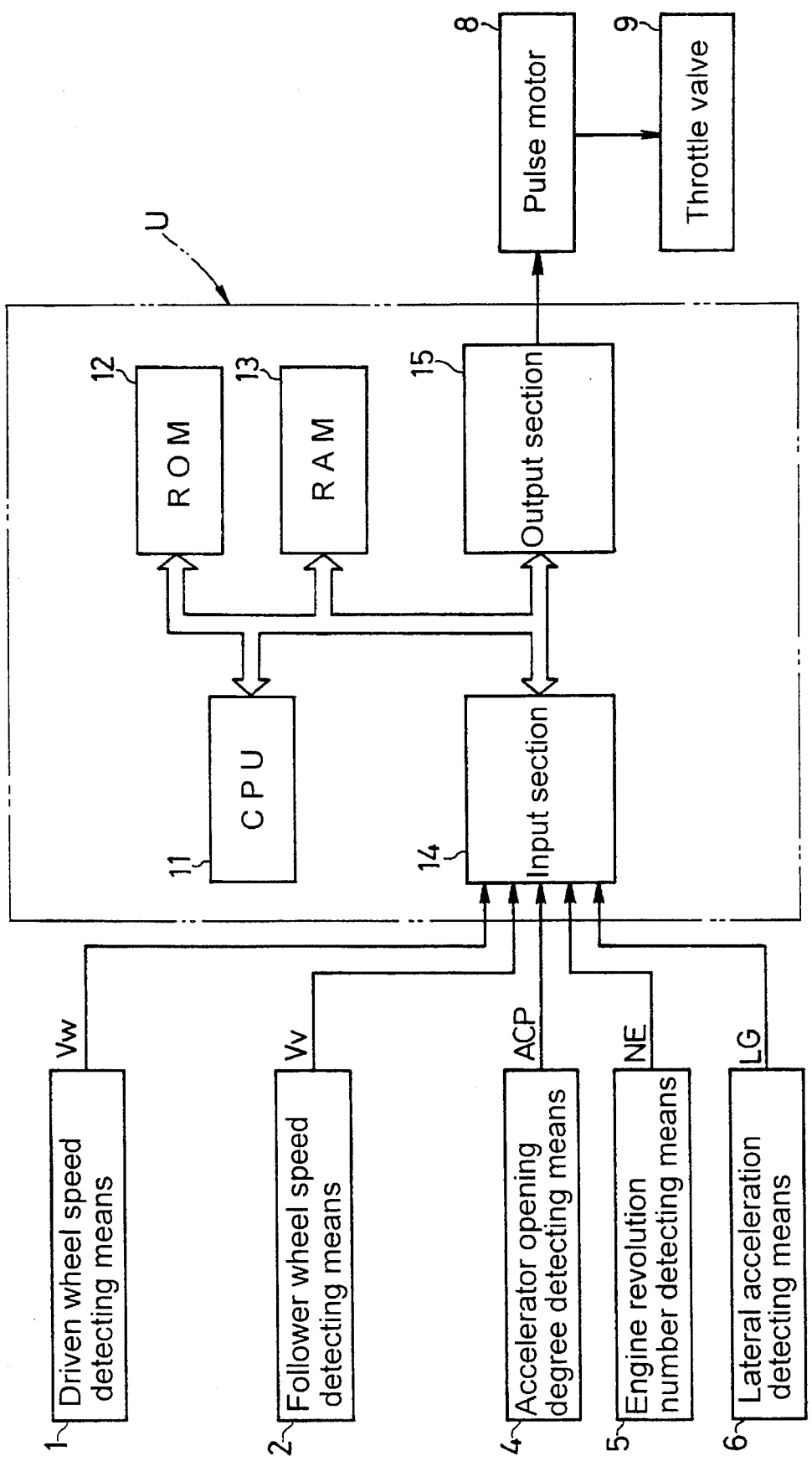
FIG. 2 is a block diagram of an electronic control unit.

FIG. 2 illustrates the electronic control unit U for controlling the output torque from the engine E by calculating each of signals from the detecting means according to a control program, and by driving the throttle valve 9 by the pulse motor 8. The electronic control unit U includes a central processing unit (CPU) 11 for performing the calculations, a read-only memory (ROM) 12 in which the control program and data, such as various maps, are stored, a random access memory (RAM) 13 for temporarily storing output signals from the detecting means and results of the calculations, an input section 14 to which are connected the detecting means (i.e., the driven wheel speed detecting means 1, 1, the follower wheel speed detecting means 2, 2, the accelerator opening degree detecting means 4, the engine revolution-number detecting means 5 and the lateral acceleration detecting means 6), and an output section 15 to which the pulse motor 8 is connected. Thus, the electronic control unit U calculates various signals received thereinto from the input section 14 and the data stored in the read-only memory 12 by the central processing unit 11 according to the control program, and finally drives the pulse motor 8 through the output section 15. This causes the throttle valve 9 to be controlled to vary the output torque from the engine E and as a result, the magnitude of a driven wheel torque is controlled.

The content of the control of driven wheel torque carried out by the electronic control unit U will be described below with reference to FIGS. 3 and 4.

Figure 3:
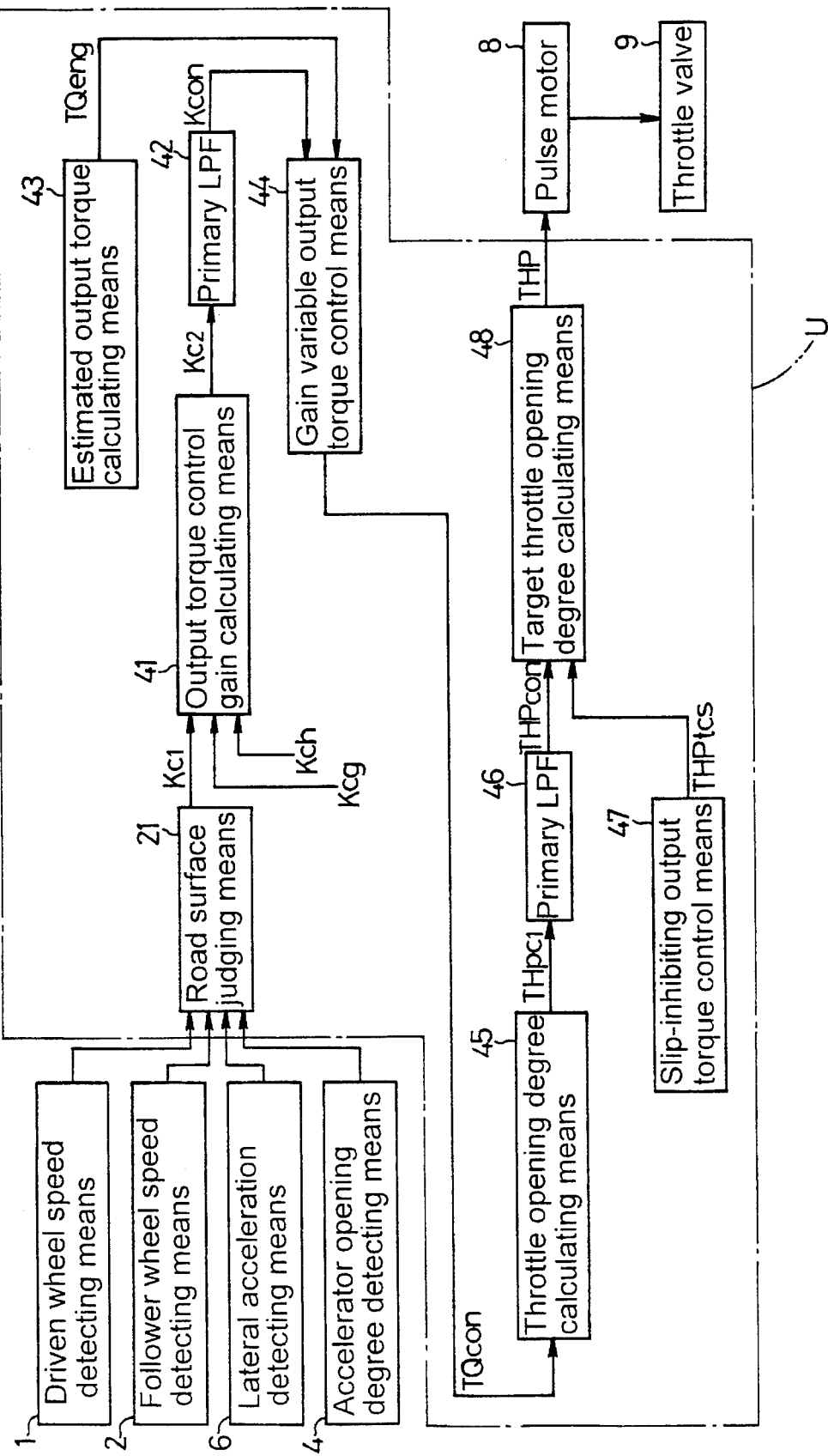
FIG. 3 is a block diagram of the driven wheel torque control system.

First, as shown in FIG. 3, a road surface condition, i.e., the magnitude of a frictional coefficient of a road surface, is judged by a road surface condition judging means 21 on the basis of the outputs from the driven wheel speed detecting means 1, 1, the follower wheel speed detecting means 2, 2, the accelerator opening degree detecting means 4 and the lateral acceleration detecting means 5.

Figure 4:
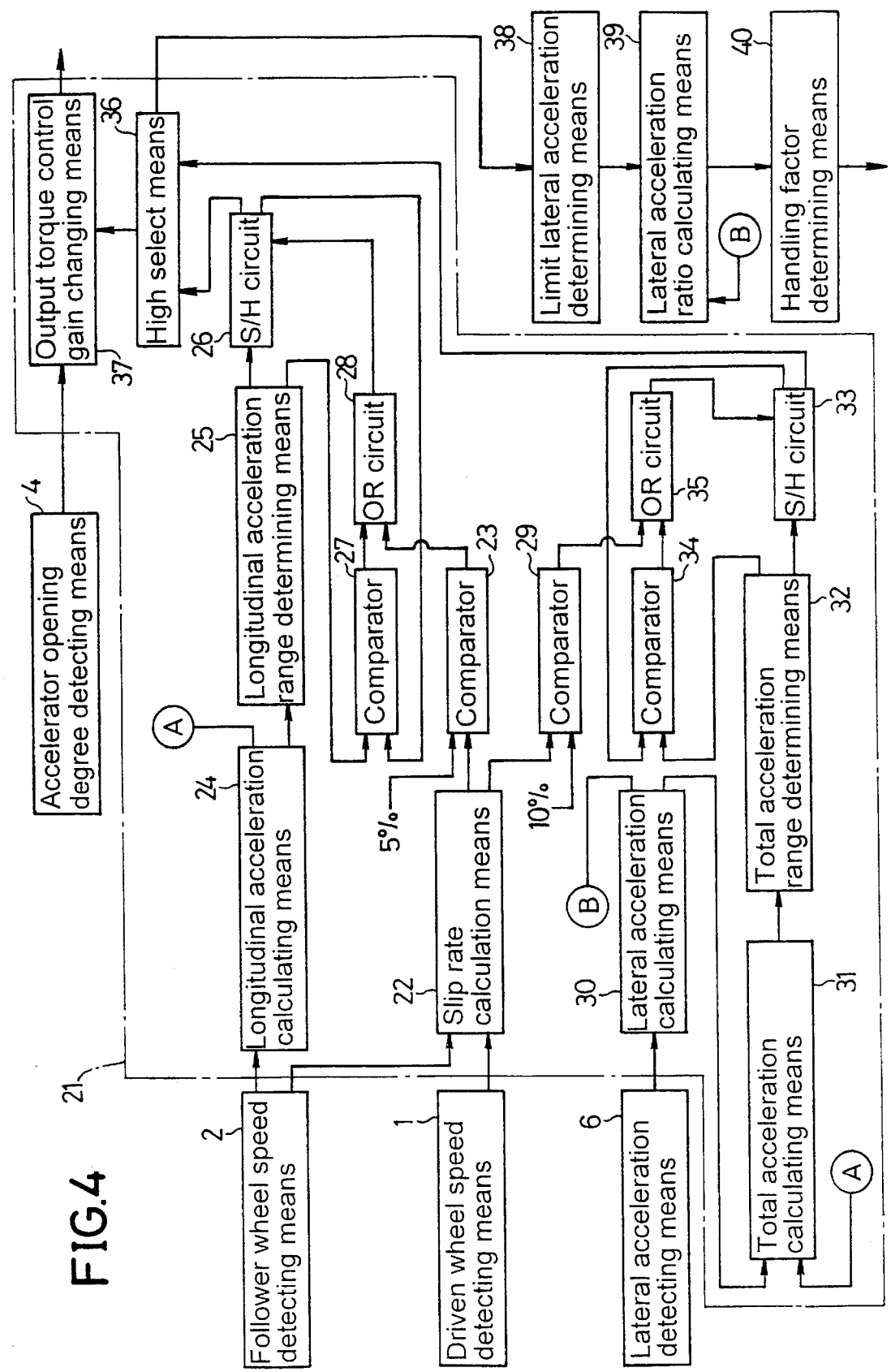
FIG. 4 is a circuit diagram of a road surface condition judging section.

FIG. 4 illustrates a circuit arrangement of the road surface condition judging means 21. First, a slip rate SLIPR of the driven wheel $W_{FL}$, $W_{FR}$ is calculated by a slip rate calculating means 22 from a driven wheel speed VW and a follower wheel speed VV according to a following expression:

$$SLIPR=\{(VW-VV)/VW\}\times 100$$

This slip rate SLIPR is compared with a first reference value (5%) in a comparator 23. An output from the comparator 23 assumes a high level, when the slip rate SLIPR exceeds 5% which is the first reference value.

A longitudinal acceleration FG (as used herein and in Table 1, TG, Table 2, LGcon and Table 3, hereinafter, G indicates gravitational units, i.e. distance/time$^2$) of the vehicle is estimated from a rate of change with time in follower wheel speed VV in a longitudinal acceleration calculating means 24, and a longitudinal acceleration range μFG is determined in correspondence to the longitudinal acceleration FG in a longitudinal acceleration range determining means 25 (see FIG. 1). The longitudinal acceleration range μFG is classified into five stages from G0 to G4 in accordance with the magnitude of the longitudinal acceleration FG. The magnitudes of the ranges G0 to G4 are set such that G0<G2<G3<G4 is satisfied.

TABLE 1

| FG | ~0.2 | ~0.4 | ~0.6 | ~0.8 | 0.8~ |
|---|---|---|---|---|---|
| μFG | G0 | G1 | G2 | G3 | G4 |

The determined longitudinal acceleration range G0 to G4 is inputted into a sample holding circuit 26 and is held therein under a predetermined condition. The held longitudinal acceleration range G0 to G4 is compared, in comparator 27, with a subsequently determined longitudinal acceleration range G0 to G4. An output from the comparator 27 is brought into a high level, when the subsequently determined longitudinal acceleration range G0 to G4 exceeds the longitudinal acceleration range G0 to G4 already held in the sample holding circuit 26. Outputs from the comparators 23 and 27 are inputted into an OR circuit 28, and an output from this OR circuit 28 is inputted into the sample holding circuit 26.

When the output from the OR circuit 28 has been brought into a high level, the longitudinal acceleration range, held in the sample holding circuit 26, is renewed. More specifically, when the slip rate SLIPR exceeds the first reference value, the current longitudinal acceleration range is held in the sample holding circuit 26, and when a new longitudinal acceleration range exceeds the longitudinal acceleration range already held in the sample holding circuit 26, such new longitudinal acceleration range is held in the sample holding circuit 26.

Figure 5:
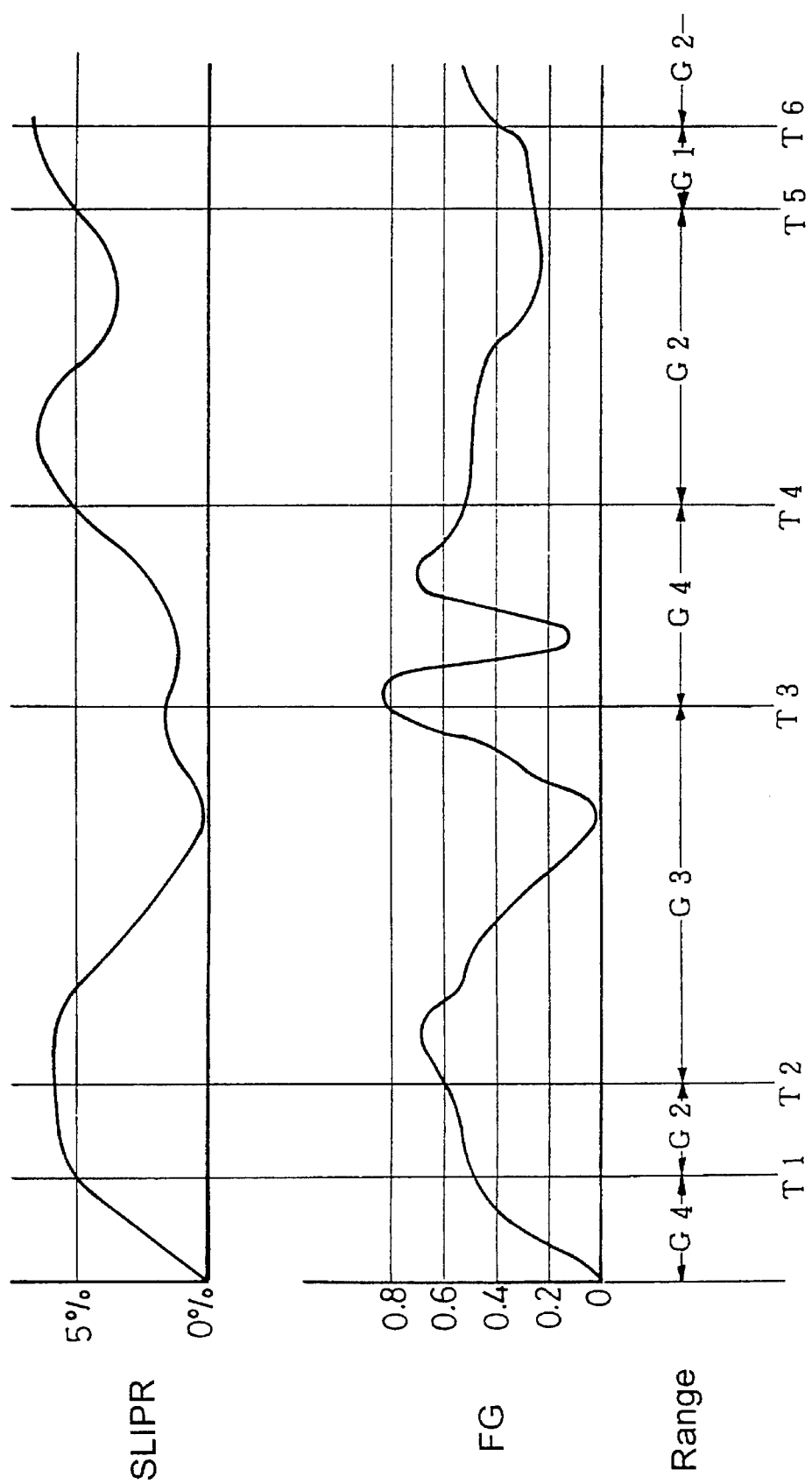
FIG. 5 is a graph for explaining a method for determining a road surface condition by a slip rate and longitudinal acceleration.

This will be further described in connection with a graph shown in FIG. 5. An initial value of longitudinal acceleration range has been set at G4 and held in the sample holding circuit 26. When the slip rate SLIPR exceeds the first reference value (5%) at a time point T1, the held value is renewed from G4 to G2 by the longitudinal acceleration range G2 of that time. When the longitudinal acceleration range is increased to G3 at a time point T2, the held value is renewed from G2 to G3 by such longitudinal acceleration range G3. Even if the longitudinal acceleration range is changed at time points T2 to T3, any changes becoming smaller than G3, which is a current held value, are ignored, and the held value is maintained at G3.

When the longitudinal acceleration range is brought into G4 and exceeds G3, which is the current held value at the time point T3, the held value is renewed from G3 to G4. Thereafter, even if the longitudinal acceleration range is changed at time points T3 to T4, any changes becoming smaller than G4, which is the current held value, are ignored, and the held value is maintained at G4.

When the slip rate SLIPR exceeds the first reference value again at the time point T4, the held value is renewed from G4 to G2 by the current longitudinal acceleration range G2.

Thereafter, even if the longitudinal acceleration range is changed at time points T4 to T5, any changes becoming smaller than G2, which is the current held value, are ignored, and the held value is maintained at G2.

When the slip rate SLIPR exceeds the first reference value again at the time point T5, the held value is renewed from G2 to G1 by the current longitudinal acceleration range G2. Thereafter, even if the longitudinal acceleration range is increased to G2, at a time point T6, the held value is renewed from G1 to G2 by such longitudinal acceleration range G2.

The slip rate SLIPR, calculated in the slip rate calculating circuit 22, is compared with a second reference value (10%) in a comparator 29. An output from the comparator 29 is brought into a high level, when the slip rate SLIPR exceeds 10% which is the second reference value.

When a lateral acceleration calculating means 30 estimates a lateral acceleration LG of the vehicle, on the basis of the output from the lateral acceleration detecting means 6, a total acceleration TG, as a sum of vectors of the lateral acceleration LG and the longitudinal acceleration FG, is estimated in a total acceleration calculating means 31. Then, a combined-acceleration range μTG is determined from the combined-acceleration TG in a combined-acceleration range determining means 32 (see Table 2). As in the above-described acceleration range, the combined-acceleration range is classified into five stages from G0 to G4 in accordance with the magnitude of the combined acceleration Tg.

TABLE 2

| TG  | ~0.2 | ~0.4 | ~0.6 | ~0.8 | 0.8~ |
|-----|------|------|------|------|------|
| μTG | G0   | G1   | G2   | G3   | G4   |

The determined combined-acceleration range G0 to G4 is inputted into a sample holding circuit 33, and the combined-acceleration range already held in the sample holding circuit 33 is compared with a subsequently generated combined-acceleration range in a comparator 34. An output from the comparator 34 is brought into a high level, when a subsequently determined combined-acceleration range exceeds the combined-acceleration already held in the sample holding circuit 33. Outputs from the comparators 29 and 34 are supplied, through an OR circuit 35, to the sample holding circuit 33.

As is the above-described longitudinal acceleration range, when the slip rate SLIPR exceeds the second reference value (10%), a combined-acceleration range of that time is held in the sample holding circuit 33, and when a new combined-acceleration range exceeds the combined-acceleration range already held in the sample holding circuit 33, such new combined-acceleration range is held in the sample holding circuit 33.

The renewing of the longitudinal acceleration range G0 to G4, held in the sample holding circuit 26, and the renewing of the combined-acceleration range G1 to G4, held in the sample holding circuit 33, are prohibited in a condition in which the braking is being conducted and in a condition in which a steering angle exceeds a predetermined value.

Then, larger one of the longitudinal acceleration range, held in the sample holding circuit 26, and the total acceleration range, held in the sample holding circuit 33, is selected in a high select circuit 36 and determined as a control acceleration range μcon=G0 to G4.

Figure 6:
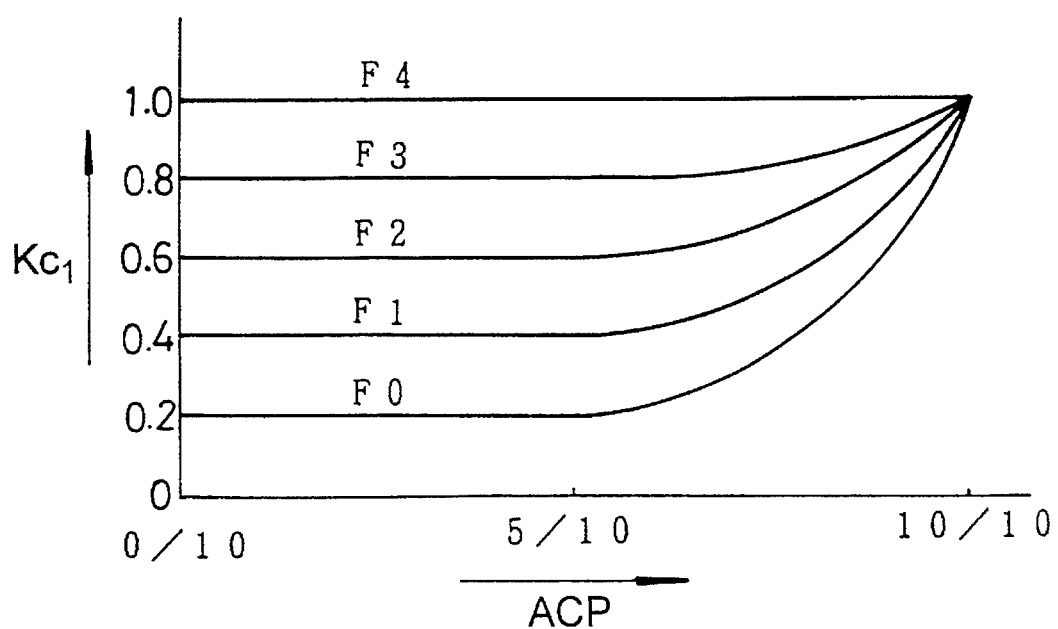
FIG. 6 is a diagram illustrating a map for determining an output torque reducing factor.

As shown in FIG. 6, five functions F0 to F4, corresponding to the control acceleration ranges G0 to G4, are established in a $kc_1$ map stored in the read-only memory 12. In an output torque control gain changing means 37, shown in FIG. 4, an output torque reducing factor $Kc_1$ is searched from the $kc_1$ map, on the basis of an accelerator opening degree ACP detected by the accelerator opening degree detecting means 4, and any one of the control acceleration ranges G0 to G4 selected in the high select means 36. The output torque reducing factor $kc_1$ assumes a maximum value of 1, when the road surface frictional coefficient, judged by the road surface condition judging means 21, is large, and the value of the output torque reducing factor $kc_1$ is gradually decreased with a decrease in road surface frictional coefficient. This ensures that the increase in output torque from the engine is reduced more strongly, as the road surface condition is such that a slip is more liable to be produced.

Then, in a limit lateral acceleration determining means 38, a limit lateral acceleration LGcon is determined from a map shown in Table 3 on the basis of the control acceleration range μcon=G0 to G4 selected in the high select means 36. The value of the limit lateral acceleration LGcon is proportional to a magnitude of the control acceleration range G0 to G4, and is set to become larger, as the control acceleration range G0 to G4 is larger.

TABLE 3

| μcon  | G0  | G1  | G2  | G3  | G4  |
|-------|-----|-----|-----|-----|-----|
| LGcon | 0.2 | 0.4 | 0.6 | 0.8 | 1.0 |

Then, in a lateral acceleration ratio calculating means 39, a lateral acceleration ratio LGK is calculated on the basis of an actual lateral acceleration LG, with respect to the limit lateral acceleration LGcon, according to a following expression:

$$LGK=LG/LGcon$$

When the lateral acceleration ratio assumes a large value, the actual lateral acceleration LG assumes a value near the limit lateral acceleration LGcon, which corresponds to a condition in which the vehicle cannot afford to be turned. On the other hand, when the lateral acceleration ratio assumes a small value, the actual lateral acceleration LG is smaller than the limit lateral acceleration LGcon, which corresponds to a condition in which the vehicle can afford to be turned.

Subsequently, in a handling factor determining means 40, a handling factor kch is determined from a map shown in Table 4 on the basis of the lateral acceleration ratio LGK. The handling factor kch is set so that it assumes a value of 1, when the lateral acceleration ratio LGK assumes a small value, whereby the vehicle can afford to be turned, and the factor kch assumes a value smaller than 1, as the value of the lateral acceleration ratio LGK is increased, whereby the vehicle cannot afford to be turned. Thus, in the condition in which the vehicle cannot afford to be turned, the increase in output torque from the engine E in accordance with an increase in accelerator opening degree is reduced.

TABLE 4

| LGK | ~0.2 | ~0.4 | ~0.6 | ~0.8 | ~1.0 |
|-----|------|------|------|------|------|
| Kch | 1.0  | 0.9  | 0.8  | 0.7  | 0.6  |

Returning to FIG. 3, an output torque reducing factor $Kc_2$ is calculated in an output torque control gain calculating means 41 by multiplying the output torque reducing factor $kc_1$ by a gear factor Kcg and the handling factor Kch. The gear factor Kcg is a factor set to correspond to a gear position of a manual transmission or an automatic transmission. The output torque reducing factor $Kc_2$, calculated in the output torque control gain calculating means 41, is subjected to a limit-processing, so that its upper limit value is defined at 1.

If the output torque reducing factor $Kc_2$, corrected by the gear factor Kcg and the handling factor Kch, is determined in the above manner, such output torque reducing factor $Kc_2$ is subjected to a primary low-pass filter 42, whereby a variation in output torque reducing factor $Kc_2$, due to variations in various parameters and a noise, is eliminated, resulting in its value becoming a final output torque reducing factor Kcon.

Figure 7:
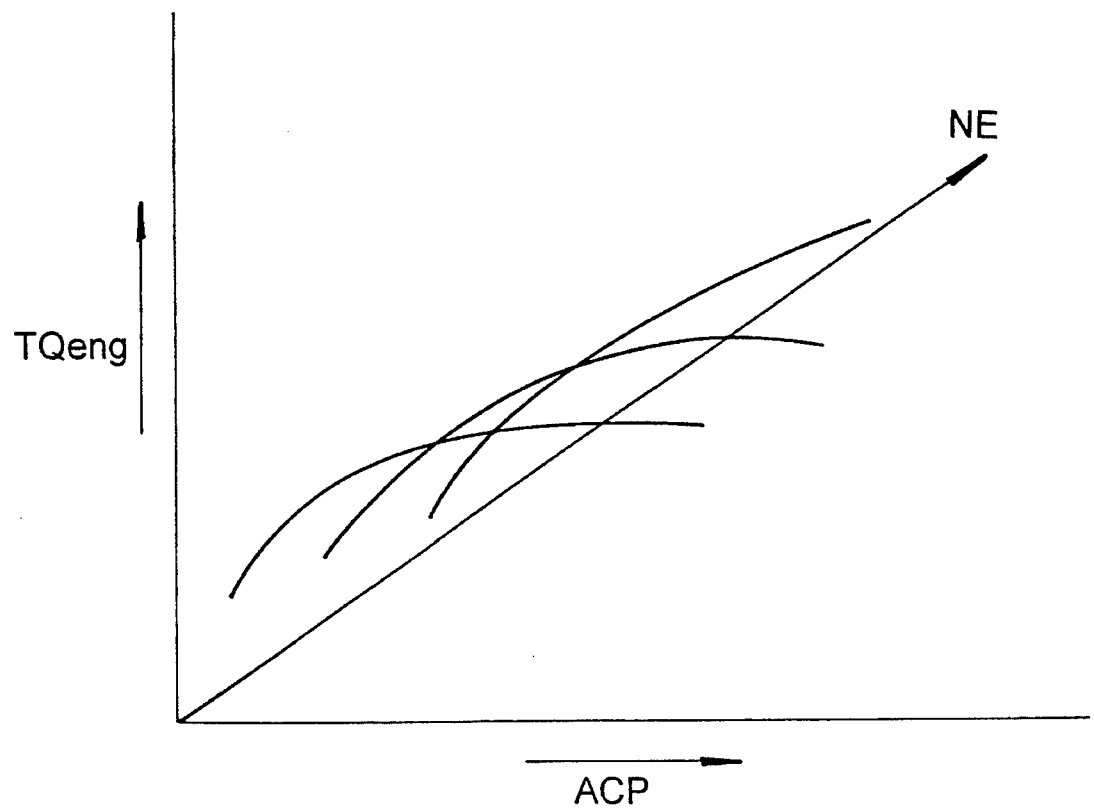
FIG. 7 is a diagram illustrating a map for determining an output torque from an engine.

In an estimated output torque calculating means 43, an estimated output torque TQeng, which can be generated by the engine E, at that time, is searched from a torque map shown in FIG. 7 on the basis of the accelerator opening degree ACP detected by the accelerator opening degree detecting means 4 and the number NE of revolutions of the engine detected by the engine revolution-number detecting means 5.

Figure 8:
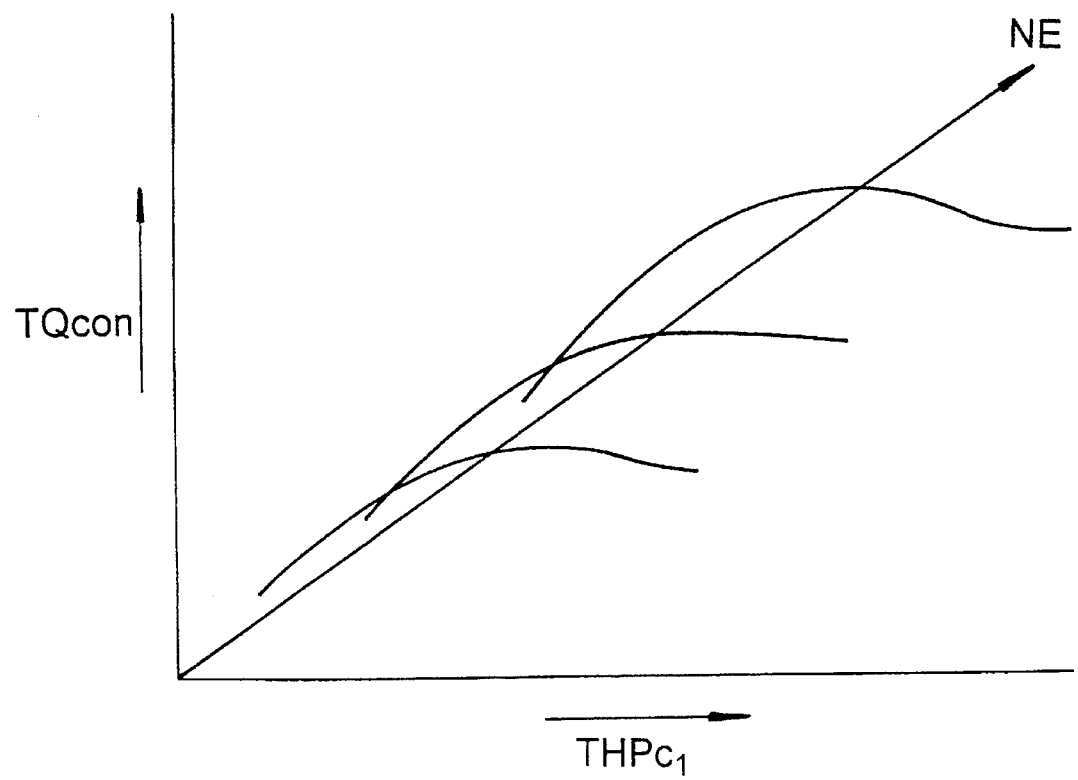
FIG. 8 is a diagram illustrating a map for determining a throttle opening degree.

Subsequently, when a target output torque TQcon, from the engine E, is calculated by multiplying the estimated output torque TQeng by the output torque reducing factor Kcon, in a gain variable output torque control means 44, a throttle opening degree $THPc_1$ is determined in a throttle opening degree calculating means 45 from a throttle opening degree map shown in FIG. 8 on the basis of the target output torque TQcon and the number NE of revolutions of the engine. Then, the throttle opening degree $THPc_1$ is subjected to a primary low-pass filter, whereby a variation in throttle opening degree $THPc_1$ due to variations in various parameters and a noise is eliminated, and such value is determined as a throttle opening degree THPcon.

In a slip-reduction output torque control means 47, which is well-known as a traction control device, a throttle opening degree THPtcs, for reducing the output torque from the engine E, is calculated in order to reduce an excessive slip of the driven wheels $W_{FL}$ and $W_{FR}$. In a target throttle opening degree calculating means 48, a target throttle opening degree THP is calculated, on the basis of the throttle opening degree THPtcs and the throttle opening degree THPcon, according to a following expression:

$$THP = W \times THPcon + (1-W)THPtcs$$

wherein w is a constant set at 1 before the operation of the slip-reduction output torque control means 47, and is set at a value in a range of 0 to 0.2 after the operation of the slip-reduction output torque control means 47.

When the target throttle opening degree THP is determined in the above manner, the pulse motor 8 is driven by a command from the electronic control unit U to change the opening degree of the throttle valve 9, thereby causing the output torque from the engine E to be adjusted.

In a condition in which the slip rate of the driven wheels $W_{FL}$ and $W_{FR}$ is relatively small, and the slip-reduction output torque control means 47 is not operated, if the slip rate exceeds a predetermined value, the output torque control gain from the engine E, with respect to the accelerator opening degree, is decreased in accordance with the frictional coefficient of a road surface. Therefore, the increase in output torque from the engine E, with respect to the amount of accelerator pedal 3 depressed, is reduced. As a result, the accelerator pedal 3 can be largely operated to delicately control the output torque from the engine E, thereby enabling a control of the slipping state of the driven wheels $W_{FL}$ and $W_{FR}$ based on a driver's will. Moreover, if the slip rate exceeds the predetermined value to decrease the output torque control gain from the engine E, such output torque control gain is varied only in an increasing direction and, therefore, the operation quantity of accelerator pedal 3 can not be excessive.

In a condition in which the slip rate of the driven wheels $W_{FL}$ and $W_{FR}$ is relatively large and the slip-reduction output torque control means 47 is operated, it is possible to control the slipping state of the driven wheels $W_{FL}$ and $W_{FR}$ on the basis of driver's will, while reducing an excessive slipping of the driven wheels $W_{FL}$ and $W_{FR}$, by using a combination of the control of the output torque control means 47 and the control of the output torque from the engine E by the gain variable output torque control means 44.

Although the embodiment of the present invention has been described in detail, it will be understood that the present invention is not limited to the above-described embodiment, and various modifications in design can be made without departing from the spirit and scope of the invention defined in claims.

For example, the prime mover may be an electric motor. In such a case, the slip-reduction output torque control means is constructed such that the armature ampere value determining an output torque from the motor with respect to an operating element is variable.

What is claimed is:

1. A driven wheel torque control system for use in a vehicle having a prime mover, comprising:

a slip-reduction output torque control means for adjusting an output torque from the vehicle in accordance with a slipping state of driven wheels driven by said prime mover in order to reduce an excessive slipping of the driven wheels;

an operation quantity detecting means for detecting an operation quantity of an operating element for adjusting the output torque from said prime mover;

a grip force detecting means for detecting a grip force of a road surface;

an output torque gain changing means for changing an output torque control gain from the prime mover with respect to an output from the operation quantity detecting means on the basis of an output from the grip force detecting means; and a gain variable output torque control means for adjusting an output torque from said prime mover on the basis of the output torque control gain changed by said output control gain changing means.

2. A driven wheel control system according to claim 1, wherein said grip force detecting means estimates the grip force of a road surface on the basis of at least one of a longitudinal acceleration and a lateral acceleration of the vehicle.

3. A driven wheel control system according to claim 2, wherein in changing the output torque control gain from the prime mover by said output torque control gain changing means, the output torque control gain s increased or decreased on the basis of an estimated grip force of the road surface when the driven wheels are in a predetermined slipping state, and only an increasing of the output torque control gain is permitted when the driven wheels are in a state other than said predetermined slipping state.

4. A driven wheel torque control system according to claim 1, wherein said gain variable output torque control means adjusts the output torque from said prime mover which is an internal combustion engine, and wherein the output torque control means, which is an intake throttle valve, is controlled, with respect to an opening degree of an accelerator pedal which is the operating element, on the 5. A driven wheel output torque control system for use in a vehicle having a prime mover, comprising:

a slip condition detecting means for detecting a slip condition of a driven wheel of a vehicle during acceleration condition of said vehicle;

an operation quantity detecting means for detecting an operation quantity of an operating element for adjusting an output torque from the prime mover of the vehicle;

a grip force detecting means for detecting a grip force of a road surface in accordance with an acceleration value of said vehicle and said slip condition;

an output torque gain changing means for changing an output torque control gain from the prime mover with respect to an output from the operation quantity detecting means on the basis of an output from said grip force detecting means; and a gain variable output torque control means for adjusting an output torque from said prime mover on the basis of the output torque control gain changed by said output control gain changing means.

6. A driven wheel torque control means according to claim 5, wherein said grip force detecting means estimates the grip force of a road surface of the basis of at least one of a longitudinal acceleration and a lateral acceleration of the vehicle.

7. A driven wheel torque control system according to claim 6, wherein in changing the output torque control gain from the prime mover by said output torque control gain changing means, the output torque control gain is increased or decreased on the basis of the estimated grip force of the road surface when the driven wheel is in a predetermined slipping state, and only an increasing of the output torque control gain is permitted when the driven wheel is in a state other than said predetermined slipping state.

8. A driven wheel torque control system according to claim 5, wherein said gain variable output torque control means adjusts the output torque from said prime mover which is an internal combustion engine, and wherein the output torque control means, which is an intake throttle valve, is controlled, with respect to an operating degree of an accelerator pedal which is the operating element, on the basis of said output torque control gain.

9. A driven wheel torque control system for use in a vehicle having a prime mover, comprising:

a slip-reduction output torque control means for adjusting an output torque from the vehicle in accordance with a slipping state of a driven wheel driven by said prime mover in order to reduce an excessive slipping of the driven wheel;

an operation quantity detecting means for detecting an operation quantity of an operating element for adjusting the output torque from said prime mover;

a grip force detecting means for detecting a grip force of a road surface;

an output torque gain changing means for changing an output torque control gain from the prime mover with respect to an output from the operation quantity detecting means on the basis of an output from the grip force detecting means; and a gain variable output torque control means for adjusting an output torque from said prime mover on the basis of the output torque control gain changed by said output control gain changing means.

10. A driven wheel control system according to claim 9, wherein said grip force detecting means estimates the grip force of a road surface on the basis of at least one of a longitudinal acceleration and a lateral acceleration of the vehicle.

11. A driven wheel control system according to claim 10, wherein in changing the output torque control gain from the prime mover by said output torque control gain changing means, the output torque control gain is increased or decreased on the basis of an estimated grip force of the road surface when the driven wheel is in a predetermined slipping state, and only an increasing of the output torque control gain is permitted when the driven wheel is in a state other than said predetermined slipping state.

12. A driven wheel torque control system according to claim 9, wherein said gain variable output torque control means adjusts the output torque from said prime mover which is an internal combustion engine, and wherein the output torque control means, which is an intake throttle valve, is controlled, with respect to an opening degree of an accelerator pedal which is the operating element, on the basis of said output torque control gain.

* * * * *